(12) United States Patent
Yadav et al.

(10) Patent No.: US 8,189,588 B2
(45) Date of Patent: May 29, 2012

(54) FLOW RESILIENCY

(75) Inventors: Navindra Yadav, Cupertino, CA (US);
Shree Murthy, San Jose, CA (US);
Vijayaraghavan Doraiswami, Santa Clara, CA (US); Peter Geoffrey Jones, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 431 days.

(21) Appl. No.: 12/403,906

(22) Filed: Mar. 13, 2009

(65) Prior Publication Data

US 2010/0235593 A1 Sep. 16, 2010

(51) Int. Cl.
*H04L 12/56* (2006.01)
(52) U.S. Cl. ......................... 370/392; 370/390
(58) Field of Classification Search .......... None
See application file for complete search history.

(56) References Cited

U.S. PATENT DOCUMENTS

| | | | |
|---|---|---|---|
| 7,065,038 B1 | 6/2006 | Brandt et al. | |
| 7,102,995 B2 | 9/2006 | Gonda | |
| 7,301,895 B2 | 11/2007 | Saleh et al. | |
| 7,321,981 B1 | 1/2008 | Muntz | |
| 7,809,827 B1 * | 10/2010 | Apte et al. | 709/224 |
| 2001/0048660 A1 | 12/2001 | Saleh et al. | |
| 2002/0042866 A1 * | 4/2002 | Grant et al. | 711/162 |
| 2002/0107980 A1 * | 8/2002 | Kawaguchi | 709/238 |
| 2002/0129159 A1 * | 9/2002 | Luby et al. | 709/236 |
| 2003/0043736 A1 | 3/2003 | Gonda | |
| 2003/0118042 A1 * | 6/2003 | Nishida et al. | 370/404 |
| 2004/0141502 A1 * | 7/2004 | Corson et al. | 370/389 |
| 2008/0013550 A1 * | 1/2008 | Yamauchi | 370/400 |
| 2008/0267078 A1 | 10/2008 | Farinacci et al. | |
| 2009/0274165 A1 * | 11/2009 | Csaszar et al. | 370/443 |

OTHER PUBLICATIONS

Cisco Technology, Inc., http://www.cisco.com/warp/public/cc/pd/si/bp8600/prodlit/cisdb_an.pdf, "Introduction to Cisco MPLS VPN Technology", Aug. 4, 2007.
Cisco Technology, Inc., http://www.cisco.com/warp/public/cc/pd/si/bp8600/prodlit/cisdb_an.pdf, "Sonet Automatic Protection Switching (APS)", Aug. 27, 2004.
Cisco Technology, Inc., http://www.cisco.comien/US/docs/ios/mtr/configuration/guide/multi-top_rtng.pdf, "Multi-Topology Routing", Jan. 29, 2008.

* cited by examiner

*Primary Examiner* — Phirin Sam
(74) *Attorney, Agent, or Firm* — Tucker Ellis LLP

(57) ABSTRACT

In an example embodiment, packets for a selected flow are replicated and sent over one or more diverse paths, such as a primary path and at least one secondary path, to a destination switching device. At the destination switching device, one copy of the replicated packets is selected for delivery to the destination, and the remaining copies are discarded. In the event that packets are not received at the destination switching device due to loss of connection on the primary path or packets are not timely delivered due to congestion on the primary path, a different path may be selected as the primary path.

18 Claims, 3 Drawing Sheets

FLOW RESILIENCY

TECHNICAL FIELD

The present disclosure relates generally to data communications.

BACKGROUND

Ethernet is a best effort transmission protocol. Internet Protocol ("IP") also provides best effort delivery. These protocols may rely on the transport layer to provide reliable delivery. For some applications, having the transport layer provide reliable delivery of packets is not an acceptable solution as the transmission semantics may not work well with higher layer applications. For example, some applications that employ real time data transmissions (numerous examples of which can be found in Financial markets where the end hosts perform replication/coalescing, etc.), Transmission Control Protocol ("TCP") layer retransmissions may significantly degrade application performance.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
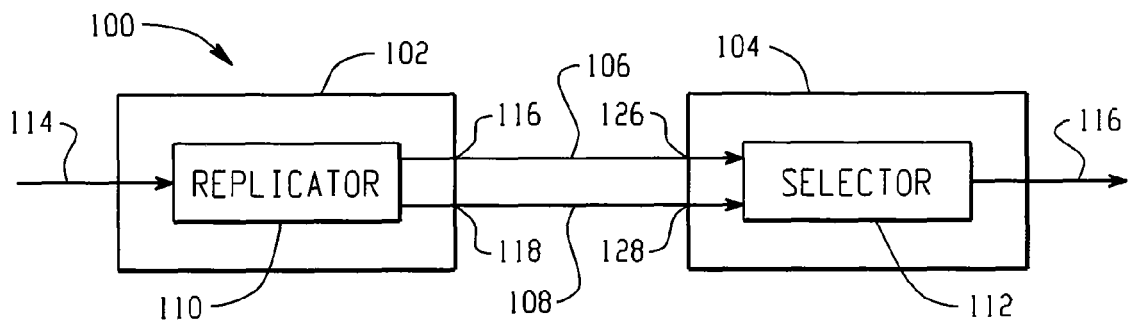
FIG. 1 illustrates an example of a network employing a primary data path and a secondary data path.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus configured to receive a plurality of data flows comprising a first output port, a second output port, and routing logic in communication with the input port, the first output port and the second output port. The routing logic is configured to obtain data representative of a selected one of the plurality of data flows to replicate. The routing logic is responsive to receiving the data representative of the selected one of the plurality of data flows to replicate the selected one of the plurality of data flows and to route a first copy on the first output port and to route a second copy on the second output port.

In accordance with an example embodiment, there is disclosed herein an apparatus comprising a first input port operable to receive a plurality of data flows, a second input port, an output port, and routing logic in communication with the first input port, the second input port and the output port. The routing logic receives a first copy of a selected data flow of the plurality of data flows with a first flow tag via the first input port and a second copy of the data flow with a second flow tag via the second input port. The routing logic transmits the first copy of the selected data flow on the output port and discards the second copy of the selected data flow.

In accordance with an example embodiment, there is disclosed herein a method, comprising obtaining a first copy of a selected data flow selected from a plurality of data flows via a first input port and receiving a second copy of the data flow via the second input port. The first copy of the data flow is forwarded. the second copy of the data flow is discarded. A determination is made whether the selected data flow is active on the first input port for a most recent predefined time period.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In order to appreciate operation of the example embodiments described herein, it is helpful to understand the Open Systems Interconnect (OSI) network hierarchy, which views a network as being composed of several hierarchical layers. In the hierarchy, Layer 1 is the physical layer containing elements that perform the transmission of signals within the network. Layer 2 is the data link layer, which provides services that allow direct communication between devices across the underlying physical channel of Layer 1. Layer 3 is the network layer, which is responsible for station-to-station data delivery over multiple data links. The network layer is responsible for the routing of packets across the network. Layer 4 is the transport layer, which provides an error-free, sequenced, guaranteed delivery, message service that allows process to process communication between stations on a network. Layer 5 is the session layer, which deals with the establishment of communications between applications. This layer is useful for security applications. Layer 6 is the presentation layer, which enables the sharing of data between networked systems using different methods of local data representation. Finally, Layer 7 is the application layer. This layer provides generic application functions, such as email, file transfer capability, and the like.

Described herein in an example embodiment is a solution to provide increased resiliency against link failures, brown outs, and/or node/switch/router failures or brownouts. The service is provided by the network which provides no additional burden on an endpoint. The endpoint receives one copy of a packet and/or transmits one copy of a packet. The example embodiments described herein are applicable to unicast and multicast traffic.

In an example embodiment, access switches/routers may be notified by an out of band mechanism of a selected flow for increased resiliency. An ingress access device (such as a switch or router) replicates the selected flow one or more times and transmits the flow to an egress access device. Each of the replicated packets may have a different rewrite and traverse diverse paths. In particular embodiments, the replicated packets traverse different topologies. For examples topologies such as VNET, Virtual Router Function (VRF), or Multi Topology Routing (MTR) can be employed to ensure replicated packets traverse diverse data paths. The egress access device (such as a switch/router) can use a selector function to select one of the replicated flows and delivers a single copy of the flow to the receiving endpoint. An example embodiment described herein can be employed to increase the reliability and experience of voice calls implemented using the voice architecture FIG. 1 illustrates an example of a network 100 with switching devices 102, 104, such as ingress/egress switches, routers, etc. between endpoints (not shown). Coupling switching devices 102, 104 are data paths 106 and 108.

Switching device 102 comprises a Replicator 110 for determining whether an input data flow is to be replicated. Replicator 110 may be implemented in logic. "Logic", as used herein, includes but is not limited to hardware, firmware, software embodied in a tangible medium and/or combinations of each to perform a function(s) or an action(s), and/or to cause a function or action from another component upon execution. Logic may comprise of one or more modules embodied in hardware and/or software operable to perform the actions and/or functions described herein. For example, based on a desired application or need, logic and/or module may include a software controlled microprocessor, discrete logic such as an application specific integrated circuit (ASIC), a programmable/programmed logic device, memory device containing instructions, or the like, or combinational logic embodied in hardware. Logic and/or a module may also be fully embodied as software. If a flow is to be replicated, the flow is transmitted on both of data paths 106, 108. If a flow is not to be replicated, the flow may be transmitted on only one of data paths 106, 108.

Switching device 104 comprises a Selector 112 for determining which data path 106, 108 should be used for receiving a replicated data flow. Selector 112 may be implemented in logic.

In operation, a plurality of data flows are received at input port 114. Replicator 110 determines whether at least one of the plurality of data flows should be replicated. A data flow that is selected for replication is replicated by Replicator 110 and a first copy of the data flow is sent via a first output port 116 on data path 106 and a second copy of the data flow is sent via a second output port 118 on data path 108. One skilled in the art should readily appreciate that data paths 106, 108 may suitably comprise switches, routers, additional network segments, etc. in connecting switch 102 with switch 104. These components are not illustrated for the purpose of simplifying the explanation of the example embodiment.

In an example embodiment, Replicator 110 may receive data out of band for selecting a flow to replicate. For example, a command line interface (not shown) may be employed for inputting data into Replicator 110 for selectively replicating data flows. In another example embodiment, Policy Based Routing (PBR) may be employed to determine whether a data flow is selected for replication. In yet another example embodiment, Netflow can be employed to identify a selected flow for replication.

In an example embodiment, each of the replicated packets may have a different rewrite to enable the selection of diverse paths For example, VNET, VRF or MTR can be employed to ensure the replicated packets traverse diverse paths between switching devices 102 and 104.

The example illustrated in FIG. 1 illustrates two data paths 106, 108 between switching devices 102, 104. This illustration merely uses two data paths for ease of illustration as those skilled in the art should readily appreciate that any physically realizable number of additional data paths may also be employed. For example, a third data path (not shown) may exist between switching devices 102, 104. As another example, a plurality of additional data paths may exist between switching devices 102, 104. Replicator 110 may replicate the packets as many times as desired up to the number of data paths between switching devices 102 and 104. Selector 112 selects one copy of the replicated packets for forwarding on output port 116.

In an example embodiment, each replicated flow has an associated flow tag. For example, a first flow tag may be associated with the data flow sent on data path 106 while a second flow tag may be associated with the data flow sent on data path 108. The flow tag may be selected from a group consisting of a Virtual Routing Function (VRF), Virtual Network (VNET) and Multi Topology Routing (MTR) tag.

In an example embodiment, logic in Selector 112 maintains data representative of a first flow state for the selected data flow received from data path 106 via a first input port 126 and a second flow state for the selected data flow received from data path 108 via a second input port 128. Routing logic in Selector 112 is operable to designate one of first port 126 and second input port 128 as a primary port and the other port a secondary port. For example, input port 126 can be selected as the primary port while input port 128 (and any other input ports) are classified as a secondary port. Packets received from the primary port are forwarded on the output port 116 while packets received on a secondary port are discarded. Logic in Selector 112 is operable to designating the second input port 128 as the primary port responsive to determining the second input port 128 is performing better than the first input port 126 based on comparing the first flow state with the second flow state. In particular embodiments, logic in Selector 112 is further based on comparing flow stability of the first input port 126 with the second input port 128.

In an example embodiment, logic in selector 112 determines the first flow state as number of packets received over a predetermined time period where the predetermined time period is a sliding window. For example the logic in selector 112 determines the number of packets received in the last second, as opposed to on second increments, e.g. at 2.5 seconds the predetermined time period would be from 1.5 second to 2.5 seconds for a predetermined time period of one second. Logic in selector 112 also determines the second flow state as number of packets received over the predetermined time period where the predetermined time period is a sliding window.

In an example embodiment, data packets received for the selected flows may include a sequence number. Logic in selector 112 is operable to adjust the sliding window upon encountering a packet with a sequence number that indicates the data packet is more recent than any data packets in the sliding window. For example, if the sliding window is 50 packets and the sequence numbers in the current sliding window are from 825 to 875, receiving a new packet with a sequence number higher than 875 will move the sliding window to the last 50 packets from the new packet. Because sequence numbers may roll over, logic in selector 112 can be configured to determine when a packet is received with a lower sequence number, whether the sequence numbers rolled over (in which case the packet should be forwarded) or whether the sequence number is for an old packet beyond the sliding window (in which case the packet should be discarded).

In an example embodiment, logic in selector 112 is operable to determine whether the selected flow is stable at each input port 126, 128. For example, a stable flow may be a flow with acceptable (which may also be configurable) jitter for a voice flow. As another example a flow may be considered active if a predetermined number of packets are received during a predefined time period. To determine stability, the predetermined time period may be divided into predefined intervals. The number of packets received during each interval can be used to determine whether the flow is stable. For example, two counters, in Profile (InC) and OutProfile (OutC) can be maintained per flow to determine whether the flow is stable, where InC represents the count of the packets which are in-profile for that flow, in the given range and OutC represents the count of packets which are out of profile. For each interval, if the number of packets received is within a range InC is incremented; otherwise OutC is incremented. In particular embodiments, a pair of counters "A" and "s" are maintained per flow. A flow with a numerically higher A and an "s" above a configured threshold is considered to be the superior flow. The superior flow is the flow is the active flow and the inferior flow is considered to be the standby flow. For example, for a predefined interval:

```
If InC >= OutC then
    Min(A++, ceil);
    s++
else
    Max(A--, floor)
    s=0
endif
For Active flow
If InC_a >= OutC_a then
    Min (A_a++, ceil)
Else
    Max (A_a++, floor)
Endif
For the standby flow
If InC_s >= OutC_s then
    Min (A_s++, ceil)
Else
    Max (A_s++, floor)
Endif
If A_a >= A_s then
    S_s = 0
Else
    S_s++
    If S_s > switch_threshold then
        Standby flow becomes the active flow
        S_a = 0
    Endif
Endif
```

Using the above, to determine if a flow is stable, compare the value of A for all related flows. If the flow with the higher A is already marked a stable flow, then nothing more needs to be done. If the flow with the higher A is not marked stable, and S for the standby flow is greater than or equal to the switch threshold, then the standby flow is the superior flow and is promoted to become the active flow and the previous active flow is demoted to become the standby flow.

From the above, in an example embodiment logic in selector 112 can select or mark a data path as either a primary or secondary data path for a selected flow. The decision can be based on flow activity and stability information. Priority weights may be assigned to flow stability and flow activity, which may also be configurable. Moreover, by determining from the layer 3 data whether the selected flow is being received and/or stable, logic in selector 112 can detect and switch primary/secondary flows in cases where the primary physical link (Layer 1) is still functioning but a flow is not being received on the primary link because of other problems such as network congestion, or the flow is interrupted at another switch/router (not shown).

In an example embodiment, logic in Selector 112 may determine which data path from a plurality of data paths for a selected flow is the primary data path based on when packets are received. For example, if logic in Selector 112 observes that packets are arriving from a secondary data path (for example from data path 108 on second input port 128) earlier than packets are arriving at the primary data path (for example from data path 106 at first input port 126), the logic in Selector can switch the primary and secondary data paths. Logic in Selector 112 may determine this by comparing sequence numbers and/or timestamps as packets arrive.

In an example embodiment, logic in Replicator 110 and/or Selector 112 can identify the selected data flow by using any persistent fields in the packet. For example, an example embodiment employs five tuples of information: source IP address, a destination IP address, a protocol selected from a group consisting of User Datagram Protocol (UDP) and Transmission Control Protocol (TCP), UDP/TCP source port and UDP/TCP destination port.

Figure 2:
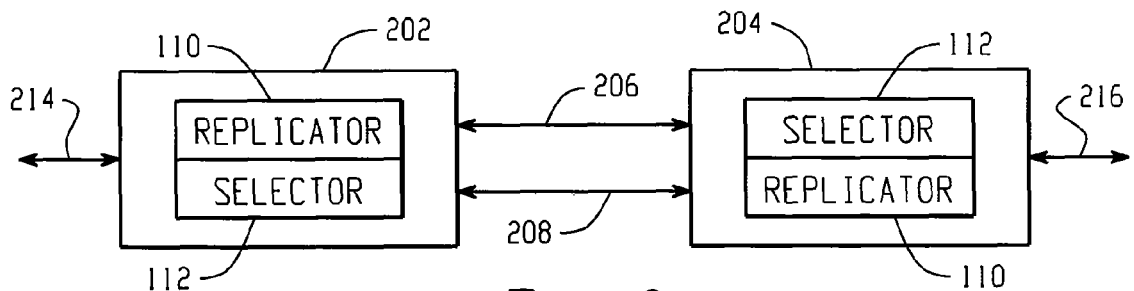
FIG. 2 illustrates an example of a network with bidirectional flows employing a primary data path and a secondary data path.

FIG. 2 illustrates an example of a network 200 with bidirectional flows employing a primary bidirectional data path 206 and a secondary bidirectional data path 208. A first endpoint (not shown) can be coupled via bidirectional flow 214 to switching device 202. Switching device 202 comprises a Replicator 110 and a Selector 112 for determining which flows to replicate and a Selector for processing replicated flows received form data paths 206, 208. Switching device 204 also comprises a Replicator 110 and a Selector 112. A second endpoint (not shown) may be coupled to bidirectional data path 216.

Figure 3:
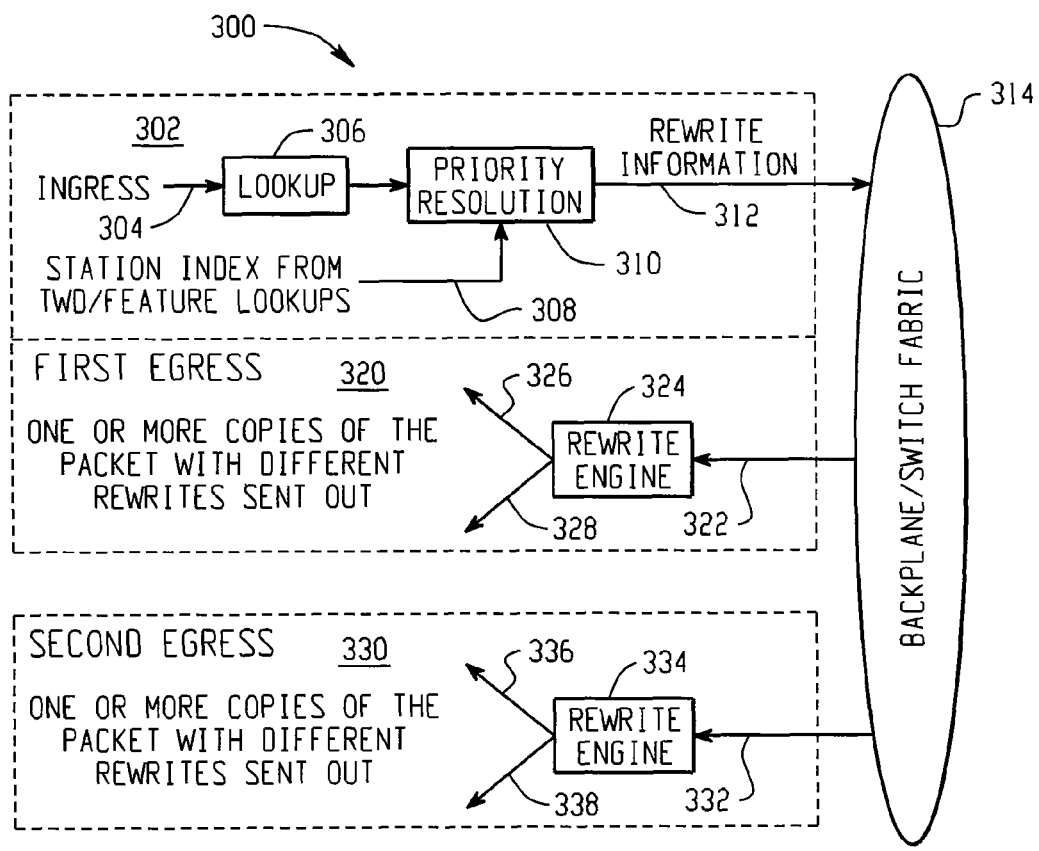
FIG. 3 illustrates an example of an Replicator in accordance with an example embodiment.

FIG. 3 illustrates an example of a Replicator 300 suitable to perform the functionality of Replicator 110 in switches 102 (FIG. 1) and 202 (FIG. 2) described herein. Switch 300 comprises an Ingress 302 that receives data on pipeline 304. Lookup 306 in ingress 302 comprises logic that determines whether a flow being received on pipeline 304 should be replicated. In an example embodiment, Lookup 306 may employ an Access Control List (ACL) and Policy Based Routing (PBR) lookup to determine which flows received on pipeline 304 should be replicated; however, any suitable technique may be employed. Priority resolution logic 310 may receive forwarding and feature lookups 308 and output rewrite information 312 with the flow. The flow is routed on Switch Fabric/backplane 314 to Egress 320 and Egress 330 for outputting. Multiple Egresses such as Egresses 320 and 330 may be employed to perform traffic forking for data streams that that contain multiple flows. For example a voice call may have multiple flows, e.g. voice, video, and/or data flows. For example a voice flow can be processed by one of Egresses 320 and 330, and a corresponding data flow processed by the other of Egresses 320 and 330.

Egress 320 receives a flow from Switch Fabric/backplane 314 on pipeline 322. The flow is processed by Rewrite Engine 324 and one or more copies of the packets for the flow are routed on pipelines 326, 328.

Egress 330 receives a flow from Switch Fabric/backplane 314 on pipeline 332. The flow is processed by Rewrite Engine 334 and one or more copies of the packets for the flow are routed on pipelines 336, 338. Note that in this example embodiment packet replication is performed. Traffic forking may be performed on a per-flow basis.

Figure 4:
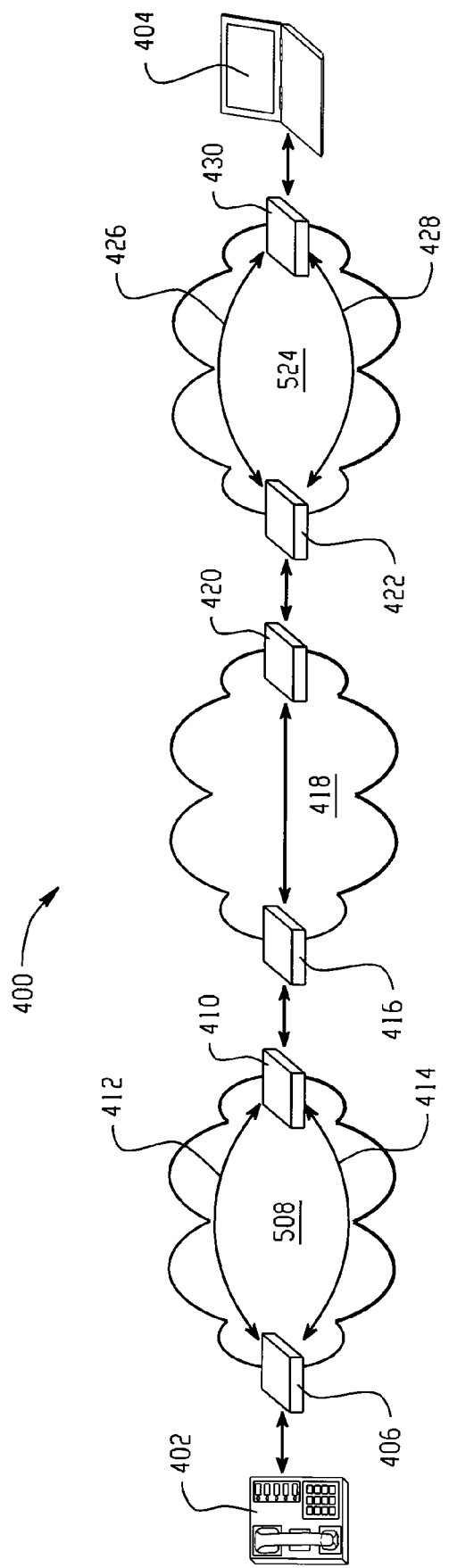
FIG. 4 illustrates an example of a data path comprising multiple segments.

FIG. 4 illustrates an example of a data path 400 comprising multiple segments. Endpoints 402 and 404 communicate with each other across networks 408, 418 and 424. In this example, when endpoint 402 sends a packet to endpoint 404, the packet is forwarded by switch/router 406 onto network 408. In this example the packet belongs to a flow designated for high resiliency and thus router 406 replicates the packet. A first copy is sent on path 412 to router 410 and a second copy is sent on path 414 to router 410. Router 410 forwards one copy of the packet to router 416 which routes the packet on network 418 to Router 420. Network 418 does not have multiple paths so only one copy of the packet is sent from router 416 to router 420. Router 420 forwards the packet to router 422 which routes the packet onto network 424. Because network 424 has multiple link between routers 422 and 430, router 422 replicates the packet and sends a first copy along path 426 and a second copy along path 428 to router 430. Router 430 then selects one of paths 426, 428 as a primary path and sends only one copy of the packet to endpoint 404.

When endpoint 404 sends a packet to endpoint 402, the packet is forwarded to router 430 onto network 424. Because network 424 has multiple links between routers 430 and 422, router 430 replicates the packet and sends a first copy along path 426 and a second copy along path 428 to router 422. Route 422 then sends a single copy of the packet to router 420 which routes the packet on network 418 to router 416. Network 418 only has a single link between routers 416 and 420, therefore a single copy of the packet is routed on network 418. The packet is then routed from router 416 to router 410 which routes the packet onto network 408. Network 408 has multiple links between routers 410 and 406, therefore, router 410 sends a first copy of the packet on path 412 and a second copy of the packet on path 414 to router 406. Router 406 receives the packets from router 410 and forwards a single copy to endpoint 402.

Figure 5:
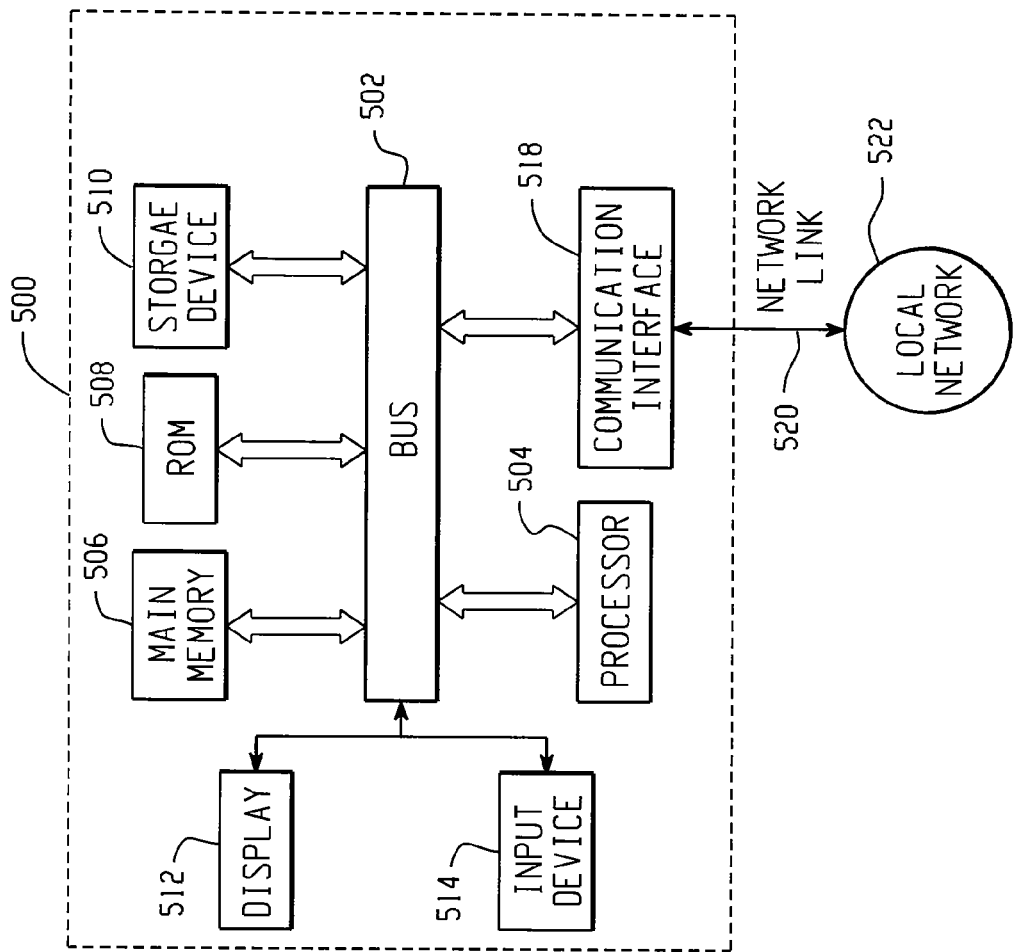
FIG. 5 illustrates a computer system upon which an example embodiment may be implemented.

FIG. 5 is a block diagram that illustrates a computer system 500 upon which an example embodiment may be implemented. Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 610, such as a magnetic disk or optical disk, is provided and coupled to bus 502 for storing information and instructions.

Computer system 500 may be coupled via bus 502 to a display 512 such as a cathode ray tube (CRT) or liquid crystal display (LCD), for displaying information to a computer user. An input device 514, such as a keyboard including alphanumeric and other keys is coupled to bus 502 for communicating information and command selections to processor 504.

An aspect of the example embodiment is related to the use of computer system 500 for flow resiliency. According to an example embodiment, flow resiliency is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 604 for execution. Such a medium may take many forms, including but not limited to non-volatile media and volatile media. Non-volatile media include for example optical or magnetic disks, such as storage device 610. Volatile media include dynamic memory such as main memory 606. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling computer system 500 to a network link 520 that is connected to a local network 522. In an example embodiment, computer system 500 comprises a plurality of communication interfaces 518 which may be coupled to a plurality of local area networks 522. Data packets for a flow may be sent and received via communication interface 518.

Although the description of the example embodiments herein describe separate input and output ports, those skilled in the art should readily appreciate that this is for ease of illustration and that a port may be both an input and an output port. Thus, the example embodiments described herein should not be construed as limited to separate input and output ports.

Figure 6:
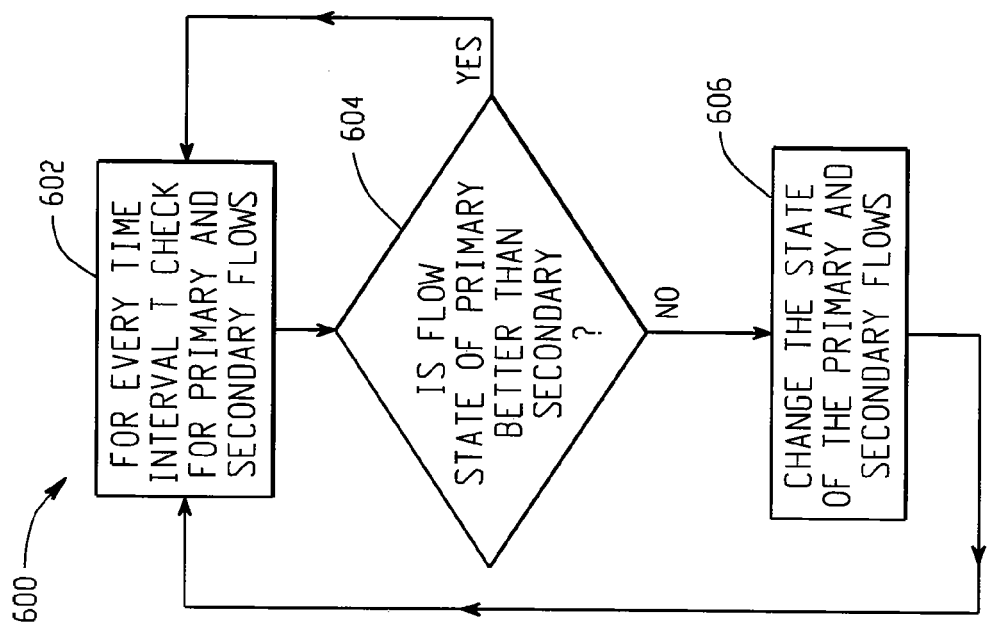
FIG. 6 illustrates an example methodology for selecting a primary flow.

In view of the foregoing structural and functional features described above, a methodology in accordance with an example embodiment will be better appreciated with reference to FIG. 6. While, for purposes of simplicity of explanation, the methodology of FIG. 6 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodology described herein is suitable to be implemented in hardware, software, or a combination thereof.

FIG. 6 illustrates an example methodology 600 for selecting a primary data path for packets being received at a first input port and a second input port for a selected flow. As described herein, packets received on the port designated as the primary port (which may be either the first or second input ports) are forwarded, while packets belonging to a secondary flow are discarded.

At the end of a predetermined interval a determination is made on which ports packets have been received for the flow as illustrated at 602. The predetermined interval may be a sliding interval which may be based on packet sequence numbers (for example the last 50 packets) or a time period (for example, the determination may be made every 250 milliseconds which includes activity for the last 250 milliseconds). Port activity may be determined by ascertaining the number of packets received during the predetermined time period. Optionally, the stability of the flow at each input port may also be calculated for each predetermined time period. In an example embodiment, stability is calculated by dividing the predetermined time period into a plurality of sub-intervals. The number of packets received for each sub interval is ascertained. For example, as was illustrated herein supra, two counters, inprofile (InC) and OutProfile (OutC) can be maintained per flow, where InC represents the count of the packets which are in-profile for that flow, in the given range and OutC represents the count of packets which are out of profile. For each interval, if the number of packets received is within a range InC is incremented; otherwise OutC is incremented. In particular embodiments, an additional pair of counters is maintained per flow. The first counter in the pair is called "A" and the other counter is called "s". The flow with a numerically higher A and an "s" above a configured threshold is considered to be the superior flow. The superior flow is the flow is the active flow and the inferior flow is considered to be the standby flow. For example, for a predefined interval:

```
If InC >= OutC then
        Min(A++, ceil);
        s++
else
        Max(A--, floor)
        s=0
endif
```

In particular embodiments:

```
For Active flow
If InC_a >= OutC_a then
        Min (A_a++, ceil)
Else
        Max (A_a++, floor)
Endif
For the standby flow
If InC_s >= OutC_s then
        Min (A_s++, ceil)
Else
        Max (A_s++, floor)
Endif
If A_a >= A_s then
        S_s = 0
Else
        S_s++
        If S_s > switch_threshold then
                Standby flow becomes the active flow
                S_a = 0
        Endif
Endif
```

Using the above, to determine if a flow is stable, compare the value of A for all related flows. If the flow with the higher A is already marked a stable flow, then nothing more needs to be done. If the flow with the higher A is not marked stable, and S for the standby flow is greater than or equal to the switch threshold, then the standby flow is the superior flow and is promoted to become the active flow and the previous active flow is demoted to become the standby flow.

At 604, if the flow state for the current primary port is better than the flow state for the secondary ports (YES) the primary port is remains unchanged. If, however, a secondary port is more stable (NO), at 606 the secondary port with the most stable flow state is changed to the primary port, and the former primary port's status is changed to a secondary port. For example, if at 602 a first input port is the primary port and a second input port is the secondary port, packets from the primary port are forwarded while packets from the secondary port are discarded. If at 604, a determination is made that the second input port has the most stable flow state, at 606, the first input port is changed to a secondary port and the second input port is made the primary port, whereupon packets received from the second input port will be forwarded while packets received from the first input port will be discarded. Upon the expiration of the predetermined interval, the statuses of the primary and secondary flows are again checked as illustrated at 602. 602, 604 and 606 may be continuously repeated.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a first output port;
   a second output port; and
   a replicating module coupled to the first output port and the second output port;
   wherein the replicating module is configured to obtain data representative of a selected one of a plurality of data flows to replicate;
   wherein the replicating module is configured to obtaining the data representative of the selected one of the plurality of data flows to replicate the selected one of the plurality of data flows and to route a first copy of the selected data flow on the first output port and to route a second copy of the selected data flow on the second output port;
   wherein a first flow tag is associated with the first copy of the selected data flow and a second flow tag is associated with the second copy of the selected data flow; and
   wherein the first and second flow tags are selected from a group consisting of multiple topologies.

2. The apparatus of claim 1, wherein the replicating module further comprises a counter, the replicating module is configured to acquire a sequence number from the counter for each packet of the selected one of the plurality of data flows to replicate and to associate a sequence number with each packet of the selected one of the plurality of data flows.

3. The apparatus of claim 1, wherein the replicating module maintains an access control list for determining which flows to replicate.

4. The apparatus of claim 1, wherein the replicating module employs policy based routing for determining which flows to replicate.

5. An apparatus, comprising:
   a first input port configured to receive a plurality of data flows;
   a second input port;
   an output port; and
   selecting module in communication with the first input port, the second input port and the output port;
   wherein the selecting module configured to receive a first copy of a selected data flow of the plurality of data flows with a first flow tag via the first input port and a second copy of the selected data flow with a second flow tag via the second input port;
   wherein the selecting module is configured to select the first copy of the selected data flow to transmit on the output port and to discard the second copy of the selected data flow while selecting the first copy of the selected data flow to transmit on the output port;
   wherein the selecting module determines a stability for the first copy of the selected data flow and a stability for the second copy of the selected data flow, the stability for the first and second copies of the selected flow is based on counts of packets received within a given range and packets that are received outside the given range for a plurality of intervals over a predetermined time period that is a sliding window; and
   wherein the selecting module selects the second copy of the selected data flow to transmit on the output port and discard the first copy of the selected data flow responsive to determining the stability of the second copy of the selected data flow is greater than the stability of the first copy of the selected flow.

6. The apparatus set forth in claim 5, wherein the selecting module maintains data representative of a first flow state for the selected data flow for the first input port and a second flow state for the selected data flow for the second input port;
   wherein the selecting module is configured to designate the first port a primary port and the second port a secondary port, wherein packets received from the primary port are forwarded on the output port while packets received on the secondary port are discarded; and
   wherein the selecting module is configured to designating the second input port as the primary port responsive to determining the second input port is performing better than the first input port based on comparing the first flow state with the second flow state.

7. The apparatus set forth in claim 5, wherein data packets for the selected flow further comprise a sequence number;
   wherein the selecting module is configured to adjust the sliding window upon encountering a packet with a sequence number that indicates the data packet is more recent than any data packets in the sliding window.

8. The apparatus set forth in claim 5, wherein the routing control module is configured to maintain flow activity statistics representative flow activity for packets received on the first input port.

9. The apparatus set forth in claim 8, wherein the routing control module is configured to maintain flow activity statistics representative flow activity for packets received on the second input port.

10. The apparatus set forth in claim 5, further comprising a third input port;
    wherein the selecting module is configured to obtaining a third copy of the selected data flow via the third port; and
    wherein the selecting module is configured to discard the third copy of the selected data flow.

11. The apparatus set forth in claim 5, further comprising a plurality of input ports;
    wherein the selecting module is configured to obtaining a plurality of additional copies of the selected data flow via the plurality of input ports; and
    wherein the selecting module is configured to discard the plurality of additional copies of the selected data flow.

12. The apparatus set forth in claim 5, wherein the selecting module is configured to identify the selected data flow by a source interne protocol (IP) address, a destination IP address, a protocol selected from group of User Datagram Protocol (UDP) and Transmission Control Protocol (TCP), a protocol source port and a protocol destination port.

13. A method, comprising:
    obtaining a first copy of a selected data flow selected from a plurality of data flows via a first input port;
    obtaining a second copy of the selected data flow via the second input port;
    forwarding the first copy of the selected data flow;
    discarding the second copy of the selected data flow while forwarding the first copy of the data flow; and
    determining a stability for the first copy of the selected data flow, the stability for the first copy of the selected flow is based on counts of packets received within a given range and packets that are received outside the given range for a plurality of intervals over a predetermined time period that is a sliding window;
    determining a stability for the second copy of the selected data flow, the stability for the second copy of the selected flow is based on counts of packets received within a given range and packets that are received outside the given range for a plurality of intervals over a predetermined time period that is a sliding window;
    forwarding the second copy of the selected data flow and discarding the first copy of the selected data flow responsive to determining the stability of the second copy of the selected data flow is greater than the stability of the first copy of the selected flow.

14. The method according to claim 13, further comprising forwarding subsequent packets from the first copy of the data flow responsive to determining the selected data flow is not active on the first input port.

15. Logic encoded in a non-transitory computer readable medium for execution by a processor and when executed operable to:
    obtain data selecting one of a plurality of data flows to replicate;
    replicate the selected one of the plurality of data flows;
    route a first copy of the selected data flow on a first output port;
    route a second copy of the selected data flow on a second output port;
    associate a first flow tag with the first copy of the selected data flow;
    associate a second flow tag with the second copy of the selected data flow; and
    wherein the first and second flow tags are selected from a group consisting of multiple topologies.

16. The logic of claim 15, the logic is further operable to:
    acquire a sequence number from a counter for packets belonging to the selected one of the plurality of data flows to replicate; and
    associate a sequence number with packets belonging to the selected one of the plurality of data flows.

17. A method, comprising:
obtaining data selecting one of a plurality of data flows to replicate;
replicating the selected one of the plurality of data flows;
routing a first copy of the selected data flow on a first output port;
routing a second copy of the selected data flow on a second output port;
associating a first flow tag with the first copy of the selected data flow;
associating a second flow tag with the second copy of the selected data flow; and
wherein the first and second flow tags are selected from a group consisting of multiple topologies.

18. Logic encoded in a non-transitory computer readable medium for execution by a processor and when executed operable to:
obtain a first copy of a selected data flow selected from a plurality of data flows via a first input port;
obtain a second copy of the selected data flow via the second input port;
forward the first copy of the selected data flow;
discard the second copy of the selected data flow while forwarding the first copy of the data flow;
determine a stability for the first copy of the selected data flow, the stability for the first copy of the selected flow is based on counts of packets received within a given range and packets that are received outside the given range for a plurality of intervals over a predetermined time period that is a sliding window;
determine a stability for the second copy of the selected data flow, the stability for the second copy of the selected flow is based on counts of packets received within a given range and packets that are received outside the given range for a plurality of intervals over a predetermined time period that is a sliding window; and
forward the second copy of the selected data flow and discarding the first copy of the selected data flow responsive to determining the stability of the second copy of the selected data flow is greater than the stability of the first copy of the selected flow.

* * * * *